United States Patent [19]
Schroeder, Jr.

[11] Patent Number: 5,649,431
[45] Date of Patent: Jul. 22, 1997

[54] THERMAL STORAGE COOLING SYSTEM

[75] Inventor: Fred L. Schroeder, Jr., Fort Worth, Tex.

[73] Assignee: TDIndustries, Inc., Farmers Branch, Tex.

[21] Appl. No.: 340,207

[22] Filed: Nov. 15, 1994

[51] Int. Cl.⁶ .................................................. F25D 17/02
[52] U.S. Cl. .................................................. 62/434; 62/435
[58] Field of Search ...................... 62/59, 139, 430, 62/434–435

[56] References Cited

U.S. PATENT DOCUMENTS

| | | | |
|---|---|---|---|
| 1,891,714 | 12/1932 | Jordan et al. | 62/59 |
| 2,737,027 | 3/1956 | Kleist | 62/59 |
| 3,653,221 | 4/1972 | Angus | 62/59 |
| 3,725,105 | 4/1973 | Chase | 117/2 R |
| 4,294,083 | 10/1981 | King | 62/434 |
| 4,332,145 | 6/1982 | Yuhasz et al. | 62/342 |
| 4,934,150 | 6/1990 | Fessler | 62/59 |
| 5,013,451 | 5/1991 | Thompson et al. | 210/708 |

*Primary Examiner*—William Doerrler
*Attorney, Agent, or Firm*—Locke Purnell Rain Harrell; Randall C. Brown

[57] ABSTRACT

A method and apparatus for reducing the costs associated with the operation of an air conditioning system is disclosed wherein the highest power usage load is shifted from the hottest part of the day to the night time hours when rates are typically lower. The apparatus includes an ice tank containing individually controlled ice building coils and an improved header that produces a water circulation pattern that enhances system efficiency.

31 Claims, 6 Drawing Sheets

THERMAL STORAGE COOLING SYSTEM

BACKGROUND OF THE INVENTION

Following World War II the United States experienced power shortages, inflated electric rates and a shortage of equipment for cooling facilities. The principles for using an ice build up/ice melt cycle to cool buildings evolved during this time. Ice was built up at night when ambient temperatures were cooler. The ice would then be used to cool water which was circulated through the facility to be cooled during the day. This equipment, however, was frequently cumbersome, inefficient and hard to regulate.

During recent years the interest in thermal storage using the ice build up/ice melt cycle has substantially increased. The cost of electricity has soared for all users, encouraging energy conservation measures. At the same time, environmental restrictions have made the use of glycol type heat exchange fluids and fluorocarbon refrigerant gases correspondingly more expensive and highly regulated, favoring environmentally friendly, energy-saving techniques.

Electric utilities have also adopted usage and demand sensitive billing systems. In this rate structure, electricity rates are more expensive during the hottest hours of the day when the demand is greater than in the evening hours. In some cases, the highest daily usage period is used to determine the rate structure for the facility throughout the year, allowing the summer peak usage to inflate a facility's rate all year, not just during the summer.

These energy conservation trends encouraged exploration of innovative technology. Unfortunately, many problems were encountered in the practical utilization of "energy storage" technology via the ice build up/ice melt cycle for the modern-day air conditioning. Frequently, the ice melt patterns were spotty or uneven, giving ineffective water flow over the ice, resulting in inefficient cooling. This was a particularly troublesome problem during conditions of partial load. The water used to cool the facility would not be lowered to the required temperature, making the system inefficient.

In some systems, the ice would be formed around glycol-containing coils. Glycol was thus circulated through the coils to freeze ice at night and act as a coolant, melting the ice during the day. As the ice melt portion of the cycle proceeded, the ice would melt from the inside out, forming a layer of insulating water around the coil, decreasing the efficiency of the system. Additionally, the glycol coolant is expensive and can be hazardous.

Previous versions of this cooling technique utilized a water circulation equipment configuration that was often unreliable. Water to be recirculated throughout the facility being cooled must be kept free of particulate matter and agitated. Previous ice melt/ice build-up thermal storage devices used air agitation which led to cooling loss and maintenance problems. The heat from the air compressor and the ambient air used by air agitation systems melted the ice, leading to system inefficiency in addition to adding contaminants to the tank and requiring energy itself. Air agitation equipment frequently experienced maintenance problems in these prior art systems, resulting in unacceptable cooling losses. Refrigerant oil tended to escape the compressor system where it was needed for lubrication and compressor cooling and migrate to the cooling coils where it was deposited when the liquid refrigerant was expanded.

Thus, there exists a need in thermal storage technology for an improved apparatus making use of the ice build up/ice melt cycle. More specifically, a more efficient apparatus is needed having improved water circulation patterns over the ice, improved agitation in the ice tank, an improved oil recovery system and one that uses no hazardous materials.

SUMMARY OF THE INVENTION

The present invention allows a building operator to "store" energy by building ice in the evening hours when energy costs are the least, then using the ice to chill water to be used in cooling a building during the day. This allows the facility's highest power usage load to be shifted from the hottest hours of the day to the night time hours when rates are lower because of reduced power demand. The invention additionally overcomes many of the problems associated with previous attempts to use ice building systems in this capacity.

The thermal storage cooling system of the present invention uses an outside-in melting pattern to avoid the loss in efficiency due to the water insulation formed around the coils in previous designs. The recirculating water is in constant contact with the ice surface. Individual control valves on each set of coils build a layer of ice that is consistent in thickness.

The design of the water distribution system allows a constant and consistent pattern of water flow over the ice such that the supply temperature is constant up to approximately ninety-five percent of the ice melt cycle. Specifically, the ice water supply header and return header distribute the recycle water over the surface of the ice-covered coils in a pattern giving even melting. A specially prepared tank contains the ice-building coils so that little or no cooling energy is lost to the atmosphere. The subject invention additionally eliminates the need for using glycol; an expensive and somewhat hazardous material. The recycled water is kept particle free and agitated by a side stream filter apparatus.

The invention also controls the oil migration in the ice-building coils by means of an equipment array that captures much of the oil before it migrates out of the compressor and recovers the rest through a modification of the coil system design.

The equipment configuration of the present invention can be controlled manually or with a computerized environmental control system.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION OF THE INVENTION

Figure 1:
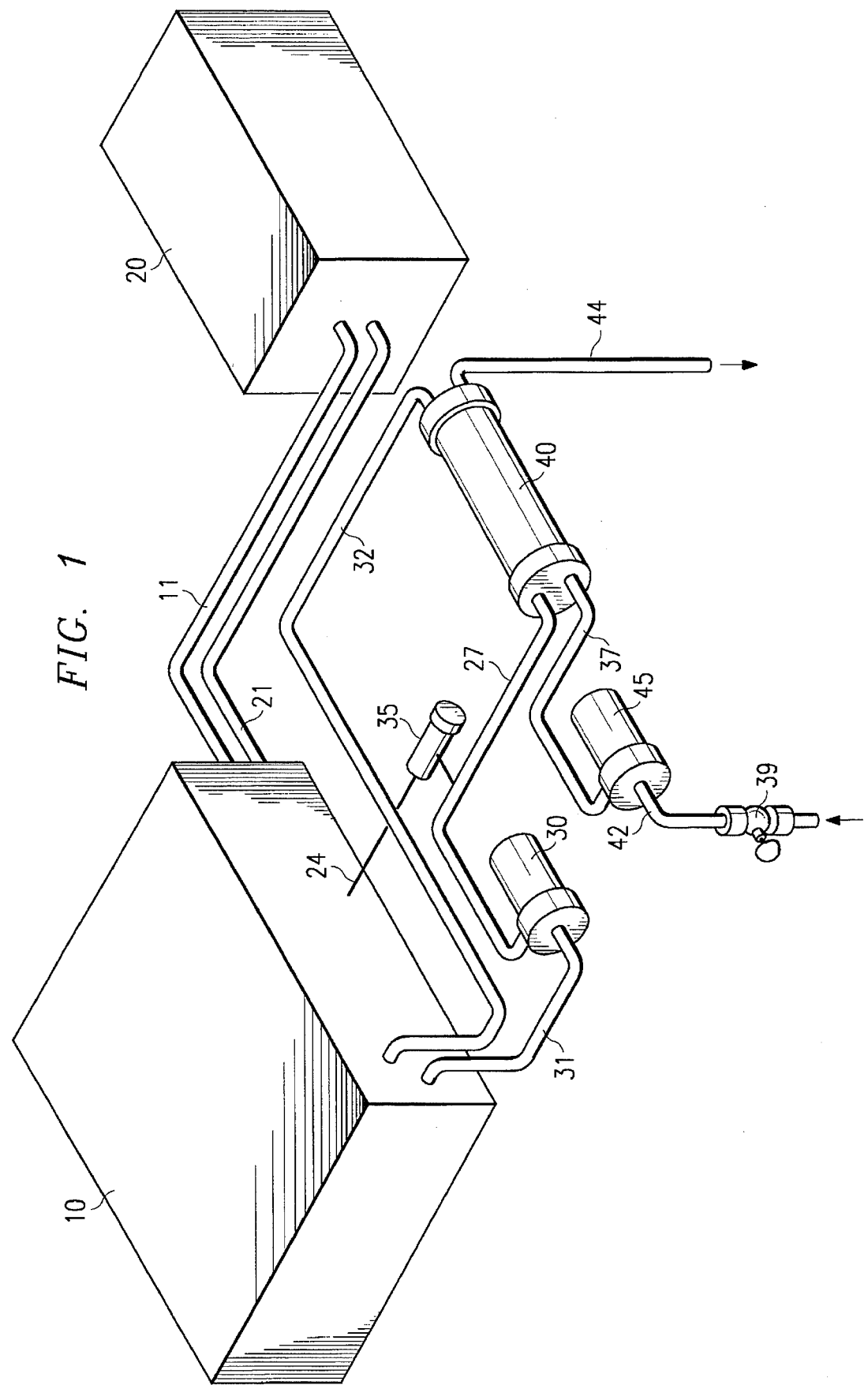
FIG. 1 is a perspective view of the thermal storage system.

An overview of the thermal storage system of the present invention is shown in FIG. 1. Ice is formed in the ice tank 10. Refrigerant, commonly a fluorocarbon, in a liquid state is directed through line 11 from an ice generator 20 to the ice tank 10 where it is expanded to produce a cooling effect. The expanded refrigerant gas is directed back to the ice generator 20 through line 21.

Ice water is withdrawn from ice tank 10 through line 31. Ice water pump 30 directs the ice water through line 27 to a heat exchanger 40 where the ice water is used to produce chilled water that can be pumped by chilled water pump 45 through line 44 to a building to be cooled. After circulation through the building to be cooled the water is recirculated through valve 39, into chilled water pump suction line 42, returning to the heat exchanger through line 37 to repeat the cooling cycle.

Alternately, the ice water can be pumped to a cooling coil (not shown) to aid in cooling a building. The cooling coil is contained within an air handling unit which cools and dehumidifies the air. This cooled air is then directly transmitted to the area to be cooled.

Having passed through the heat exchanger 40 and performed its cooling function, the water from the ice tank is returned to the ice tank through ice water return line 32. The ice water stream is continuously filtered by side stream filter 35. A portion of the ice water stream is directed from line 27 into the side stream filter 35 where particulate matter is removed. The filtered water is reinjected into ice tank 10 through line 24. This continuous recycling also provides agitation to the water in the ice tank 10 which assures a more through and consistent melt of the ice.

Figure 2:
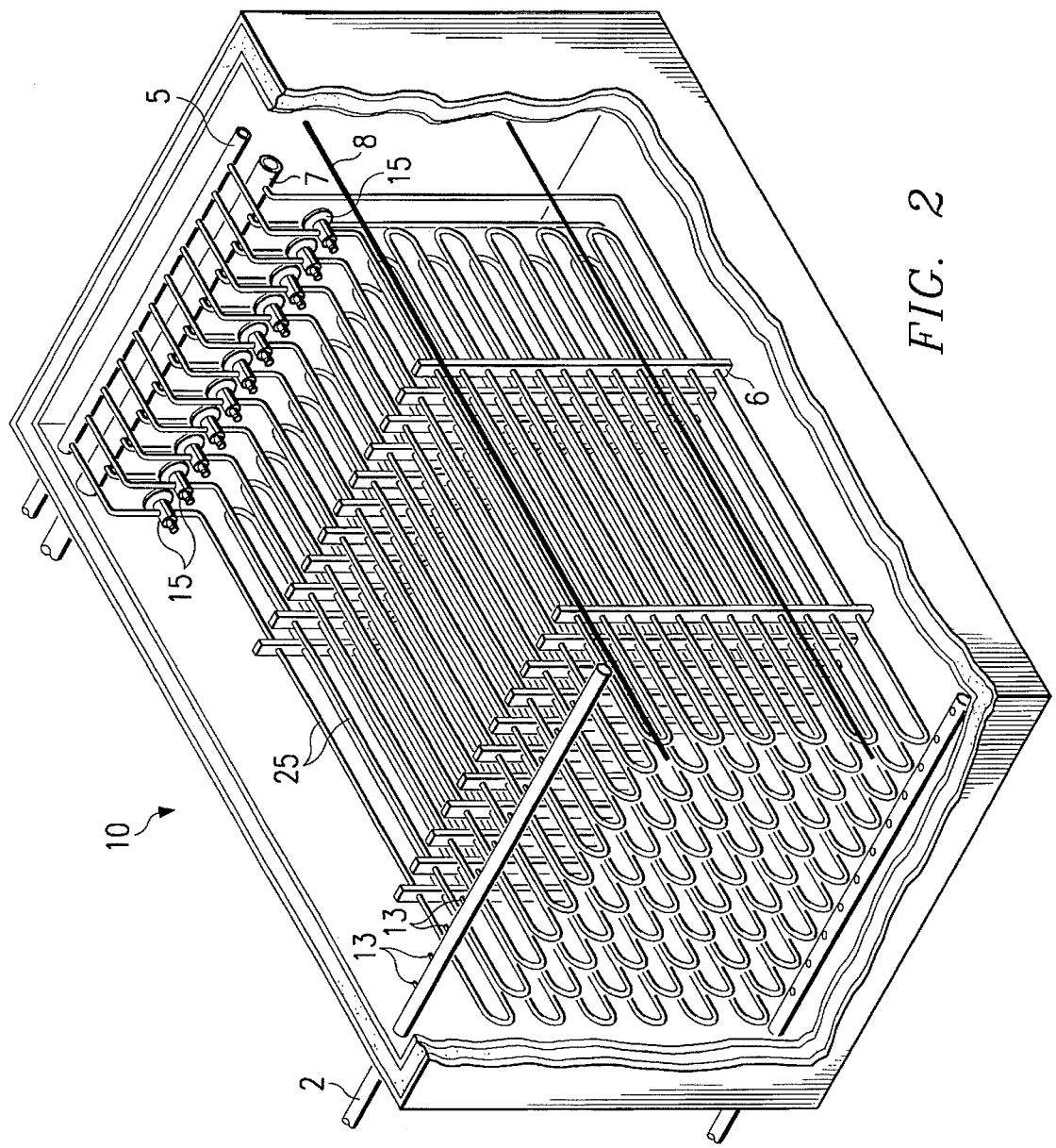
FIG. 2 is a perspective view of the ice tank.

FIG. 2 shows a perspective view of the ice tank 10. Liquid refrigerant gas enters the ice tank through liquid header 5. The liquid header 5 distributes liquid refrigerant to the thermal expansion valves 15 arrayed along the liquid header. Each coil 25 has an individual thermal expansion valve 15. The liquid refrigerant is fed into the coils through the thermal expansion valves 15 where the refrigerant flashes into a gas, producing a cooling effect in the ice-building coils. The refrigerant gas is circulated through the ice-building coils 25 and returned to suction header 7 to be directed to the ice generator 20.

Figure 3:
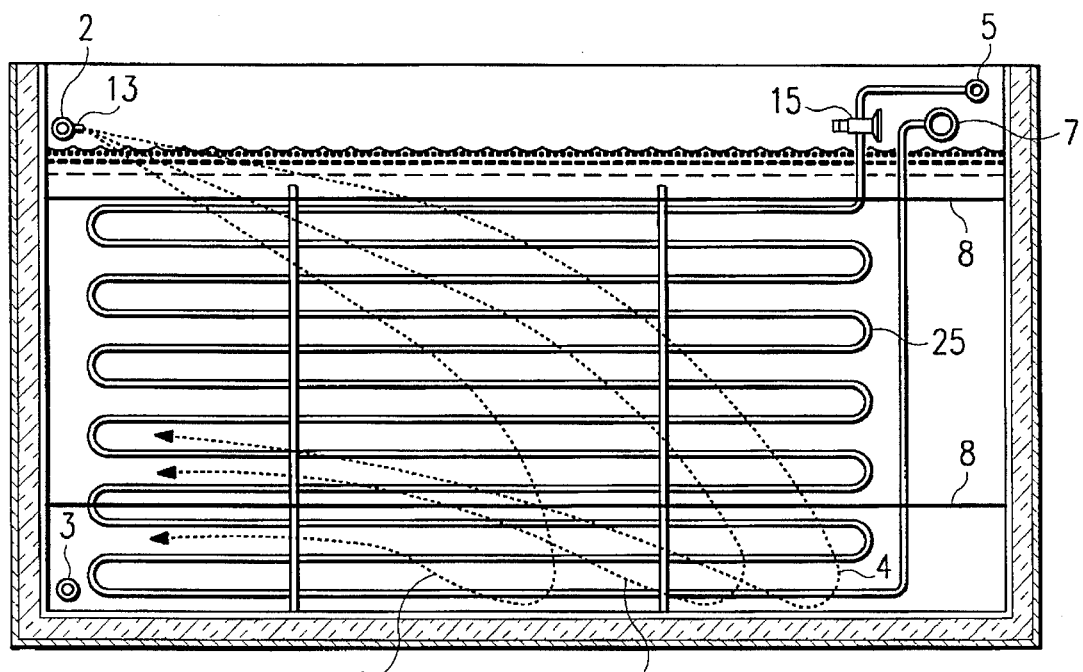
FIG. 3 is a cross-sectional view of the ice tank showing the circulation of water over the coils.

FIG. 3 shows the water circulation pattern over the ice-building coils 25. The ice building coils 25 are constructed of a heat conductive substance, preferably commercial quality rolled mild carbon steel stock conforming to ASTM A135, although those skilled in the art of refrigeration design would realize that other materials may be used.

The O.D. of the pipe making up the coils 25 is preferably a nominal 1.638 in. with a minimum wall thickness of 0.085 inches, although other sizes may be used. The coils 25 are preferably coated on the exterior only with a corrosion resistant galvanized coating. The coils 25 are fashioned in a serpentine shape and adapted to be placed in the ice tank 10 parallel to one another preferably about 6 inches apart so that no ice bridging between the coils occurs.

The coils are supported by vertical supports 6, preferably of galvanized angle iron and by tensioning rods 8. This combination of vertical supports 6 and tensioning rods 8 supports the coils 25 in the vertical position and supports the ice tank 10 against deformation due to the hydrostatic pressure of water during operation.

The ice water return header 2 directs the flow of water 4 between and around the length of the ice building coils 25. The water flow 4 is directed between and around the ice coils 25 by a series of jets 13 attached to the ice water return header 2. The jets 13 are directed so as to discharge water to the space between each coil 25, preferably at a fifteen degree angle down from the horizontal. Preferably, the jets 13 are located slightly above the water line to project the returned water between the ice formed on the ice building coils 25 and away from the ice water supply header 3. The water is cooled as it passes among the ice-covered coils and is directed into the ice water supply header 3, to be circulated by ice water pump 30 to the heat exchanger 40 as seen in FIG. 1. This arrangement using jets 13 eliminates the use of internal baffles or channels.

Constant and consistent water circulation is critical to the cooling efficiency of the thermal storage system. Uneven or spotty melting caused by an ineffective water flow over the ice can cause inefficient cooling. The water circulation pattern provided by this arrangement yields water with a constant supply temperature up to approximately ninety-five percent of the ice melt cycle.

Figure 4:
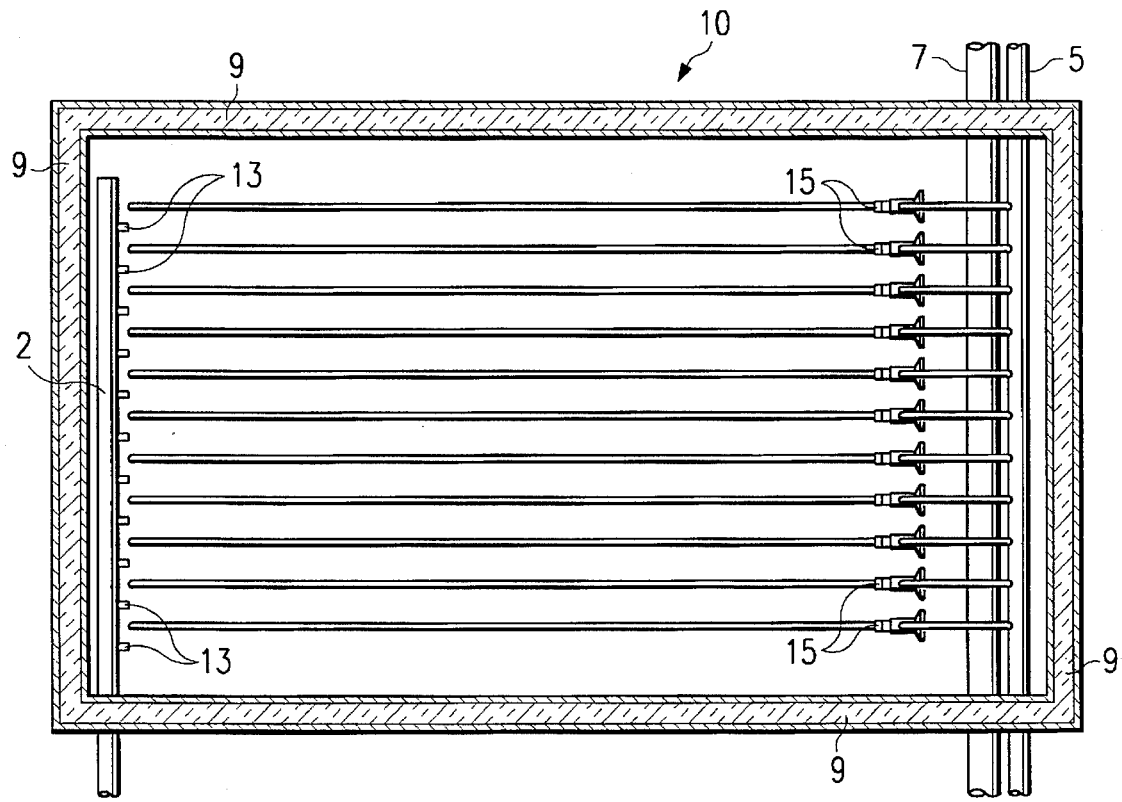
FIG. 4 is a plan view of the ice tank.

FIG. 4 is a plan view of the ice tank 10 showing the configuration of the ice water return header 2 with jets 13, the ice-building coils 25, the thermal expansion valves 15, the liquid refrigerant header 5, and the refrigerant suction header 7. The ice tank insulation layer 9 is preferably a layer of polystyrene board. The ice tank itself is preferably fabricated of 3/16" structural quality mild carbon steel that has been sand-blasted on the interior of the tank to a white blast finish and coated with an epoxy paint, most preferably to a thickness of 10 mils. The ice tank 10 also has a removable roof (not shown) that fits tightly on the ice tank 10. The tank roof is comprised of the same layers of insulation as the ice tank 10 itself and painted white. This interior coating renders the interior of the tank corrosion resistant. This is particularly important since water treatment chemicals are biodegradable, making their protective properties somewhat unreliable.

Figure 5:
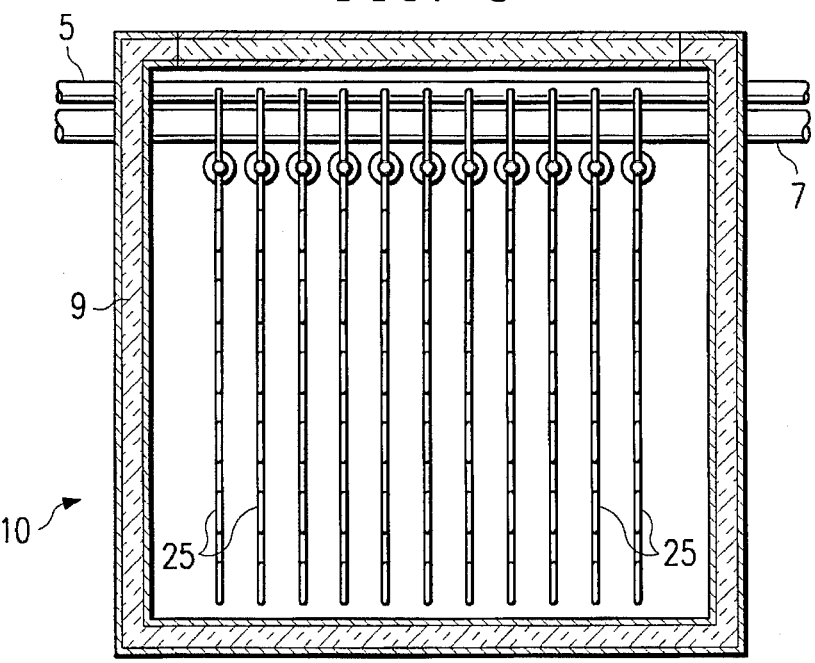
FIG. 5 is a cross-sectional view of the ice tank showing the suction header, the liquid header and the ice water supply.

FIG. 5 is a cross-sectional view of the ice tank 10 with its insulation layer 9, the ice-building coils 25, the liquid refrigerant header 5 and the refrigerant suction header 7.

Figure 6:
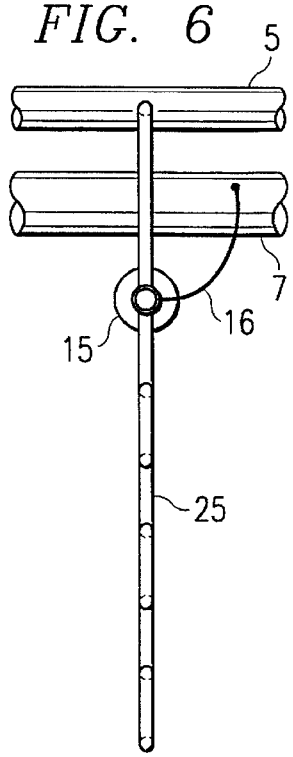
FIG. 6 is a front view of the ice control valve configuration.

FIG. 6 shows the circulation path of the refrigerant gas in the ice tank 10. Liquid refrigerant is received in liquid refrigerant header 5 from the ice generating apparatus 20, consisting of a conventional refrigeration system having a compressor and a condenser. The liquid refrigerant is directed to a series of thermal expansion valves 15, one of which is seen in FIG. 6 by way of illustration. The thermal expansion valve 15 is preferably of the balanced port design which offers greater system stability under widely varying load conditions.

As superheat at the compressor suction header 7 rises, the increase is sensed and transmitted to the thermal expansion valve 15 by thermal expansion valve thermostatic element 16. The thermal expansion valve 15 then increases or decreases the refrigerant flow into the ice-building coil 25 until the superheat returns to the predetermined valve setting. Conversely, a reduction in the heat load will cause a decrease in refrigerant flow to the ice building coil 25. As the refrigerant flow increases, ice building capacity of the coil increases.

Figure 7:
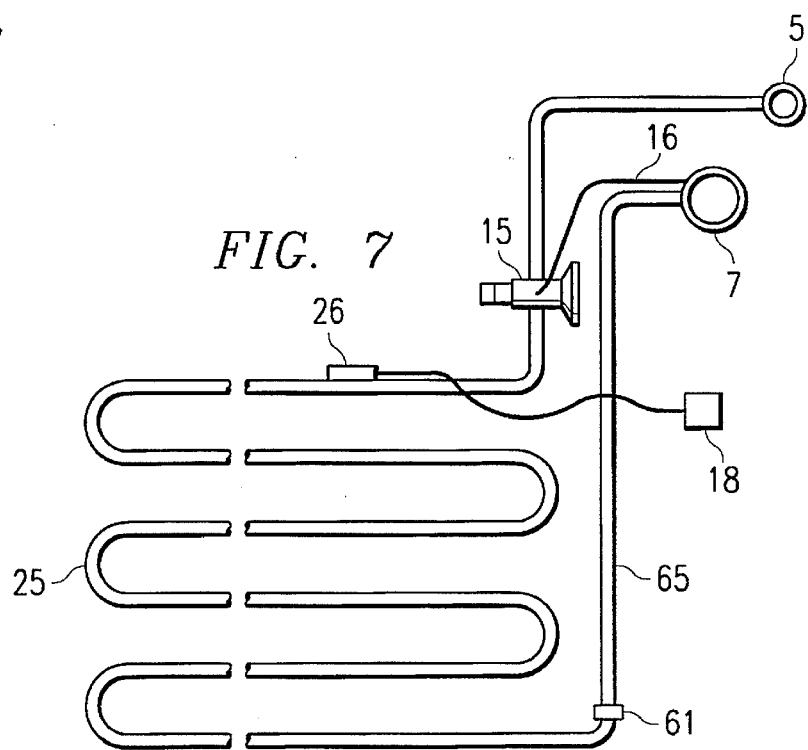
FIG. 7 is a side view of the ice control valve configuration.

A cross-sectional view of the path of the refrigerant gas path through the ice-building coil 25 and the thermal expansion valve 15 can be seen in FIG. 7. The thickness of the ice bank built up on the ice-building coils is determined by the ice bank control 26. A thickness sensitive bulb in the ice bank control senses when the bulb is completely covered with ice, transmitting a signal to the liquid line solenoid 18, outside the ice tank, which stops the flow of liquid refrigerant to the ice-building coils 25. This will be seen in greater detail in FIG. 10. The ice bank control is placed on a coil surface, in the upper midsection of the ice tank.

Figure 8:
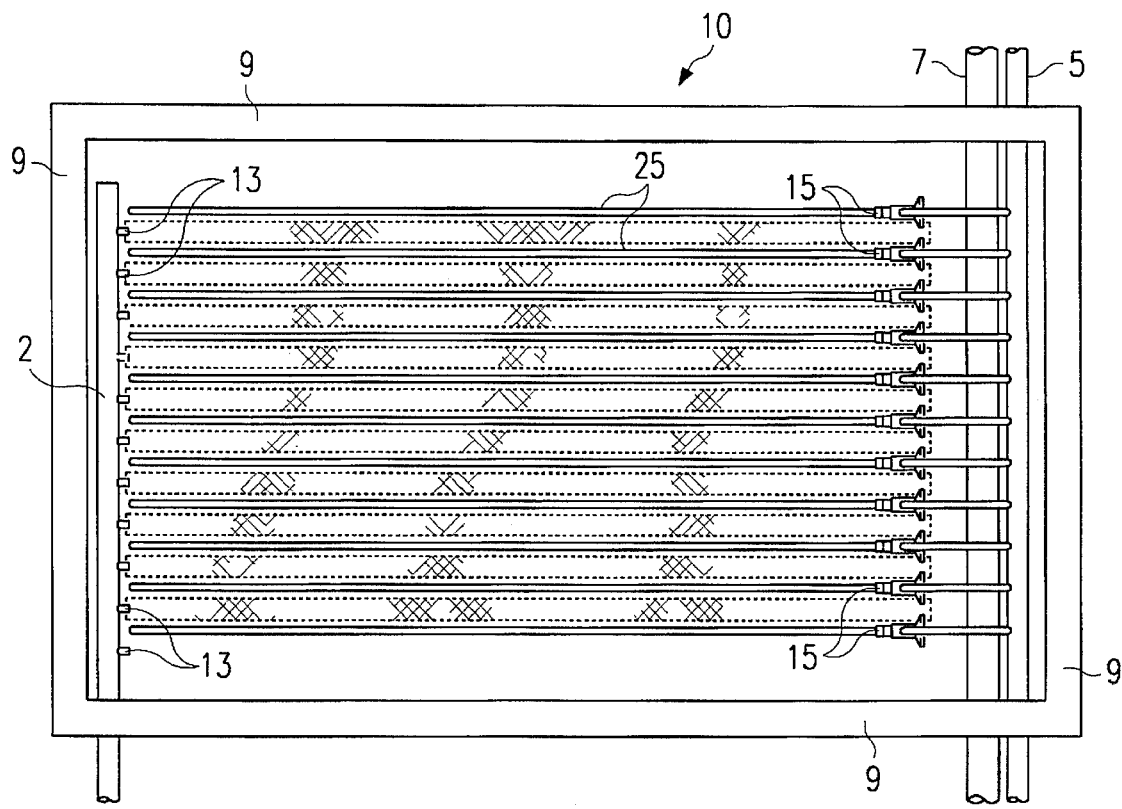
FIG. 8 is an overhead view of the ice tank during operation after ice has been formed on the coils.
Figure 9:
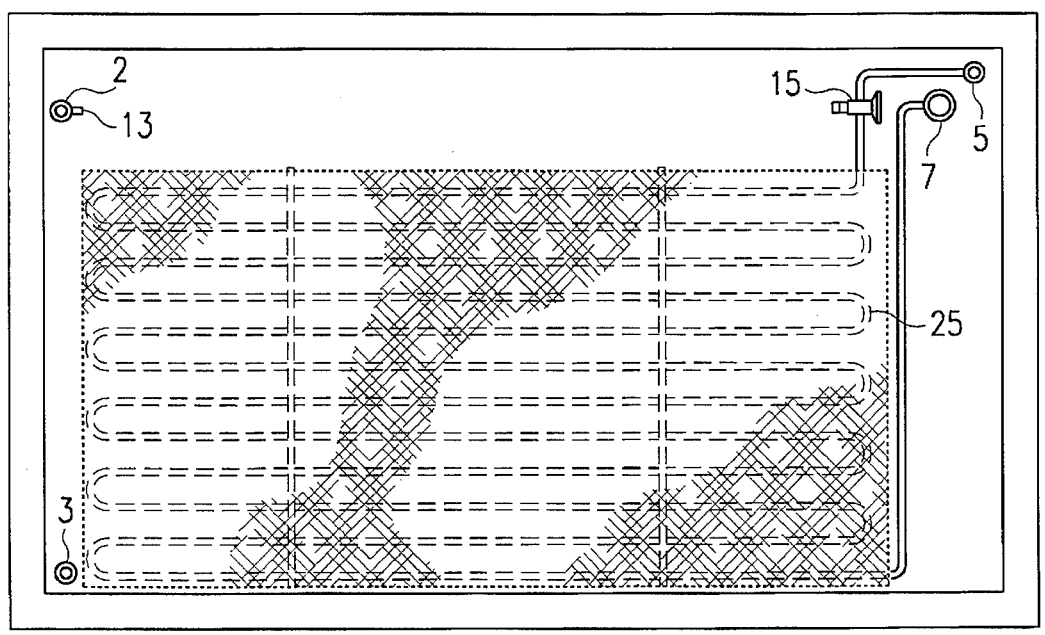
FIG. 9 is a cross-sectional view of a coil after ice has been formed.

FIG. 8 shows the thermal storage system of the present invention in operation. Ice is built up on the ice building coils 25. Water is circulated from ice water return header 2 through jets 13 into the area between the ice-bearing coils. FIG. 9 is a side view of the ice built up on a coil 25. Water flows between the sheets of ice formed on the coils 25 during the melt cycle.

Figure 10:
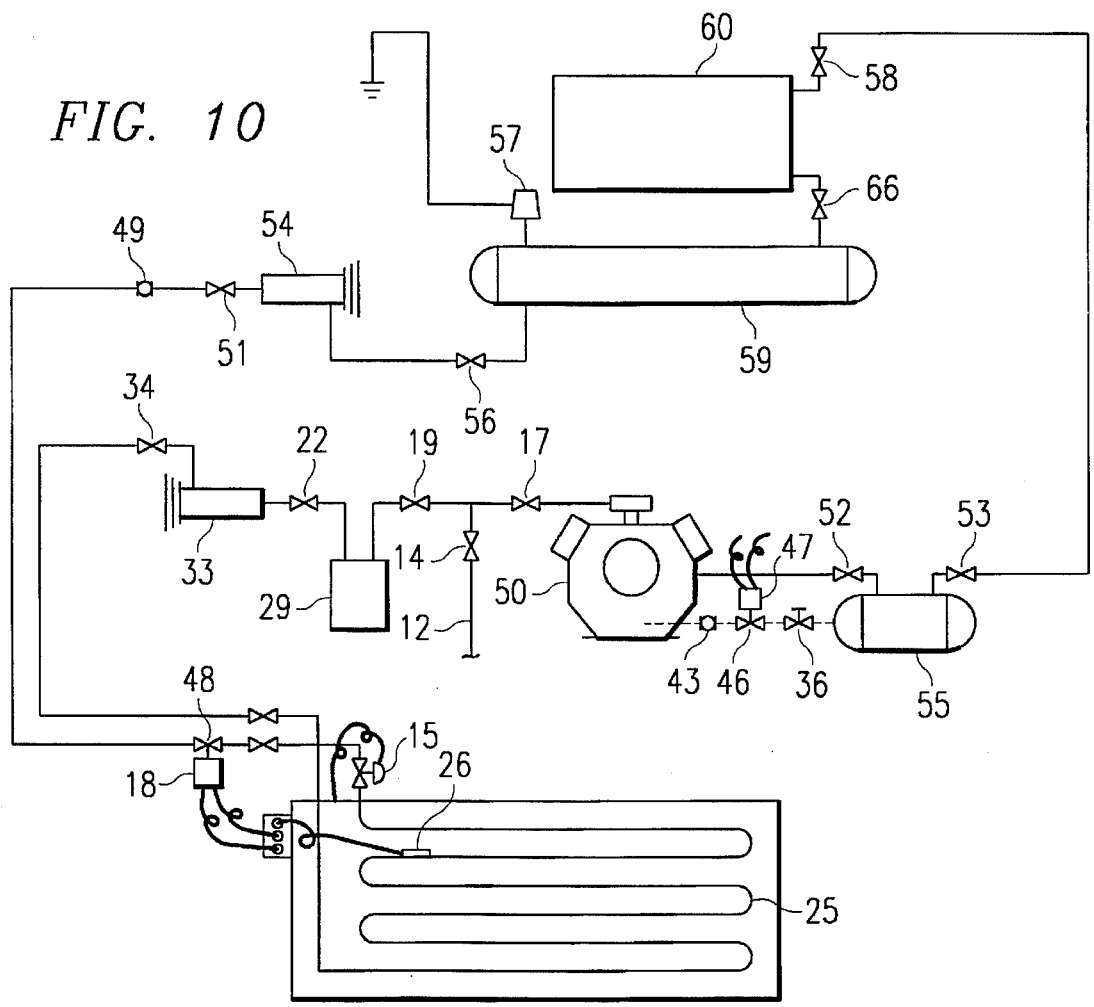
FIG. 10 is a schematic of the components of the thermal storage system relating to the refrigeration cycle.

FIG. 10 shows the refrigeration cycle and the components of the ice generator 20 in greater detail. Compressor 50 compresses the refrigerant gas, directing the hot gas through an isolation valve 52 to oil separator 55. The hot refrigerant gas exits the oil separator through an isolation valve 53 and is directed through valve 58 to the condenser 60. Condenser 60 removes heat from the refrigerant gas, converting it to a liquid state using either air or water as the cooling means. The liquid refrigerant is transmitted to receiver 59 through valve 66 where the refrigerant is accumulated. Receiver 59 has relief valve 57 which relieves to the atmosphere, enhancing safety by preventing over-pressurization.

The liquid refrigerant is directed from the receiver 59 through valve 56 to the liquid line filter dryer 54 where contaminants such as moisture, acids and oil breakdown products are removed. The liquid refrigerant then passes through valve 51 and sight glass 49 to valve 48 controlled by liquid line solenoid 18.

The liquid refrigerant enters the liquid refrigerant header (not shown) and passes through thermal expansion valve 15 where it is expanded into the gaseous state in ice-building coil 25. The thickness of the ice bank is controlled by ice bank controller 26 which is connected to liquid line solenoid 18 controlling valve 48.

The refrigerant gas exits the ice-building coil 25 into refrigerant suction header (not shown). The refrigerant gas passes through valve 34 into suction line filter dryer 33 which removes contaminants from the refrigerant stream. The refrigerant gas then flows through valve 22 into suction line accumulator 29 where refrigerant can be collected if the system experiences a sudden return of liquid refrigerant that could damage the compressor 50. The refrigerant gas finally passes through valves 19 and 17 to reach the compressor suction. Alternately, the refrigerant gas can be routed to a second compressor (not shown) through valve 14 and bypass 12.

The oil recovery system of the present invention is of particular significance to the invention. Crankcase oil is necessary to the functioning of the compressor 50. Crankcase oil is, however, miscible with the refrigerant gas/liquid and tends to migrate through the refrigeration system. For this reason, the refrigerant gas exiting the compressor 50 is routed through oil separator 55 to capture fugitive oil from the refrigerant gas. Oil captured in oil separator 55 is routed through valve 36 and valve 46 controlled by solenoid 47. The oil is then directed through sight glass 43 and into the crankcase of compressor 50.

Some oil, however, will still be carried from the compressor 50 through the condenser 60, into the expansion valve 15 where the liquid refrigerant is converted to a gas. The oil is dropped out in the ice-building coil 25 when the refrigerant changes from a liquid to a gas. FIG. 7 shows a vertical riser 65 of smaller diameter than the ice-building coils 25 attached to the lower horizontal row of the ice-building coils by an eccentric reducer 61. The smaller diameter of the vertical riser 65 serves to increase the refrigerant gas velocity to promote the oil return to the compressor 50.

Figure 11:
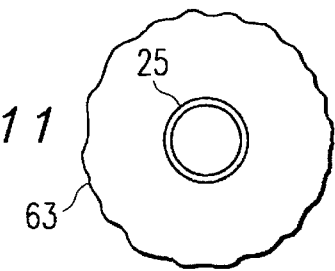
FIG. 11 is a coil having ice build-up on its surface.
Figure 13:
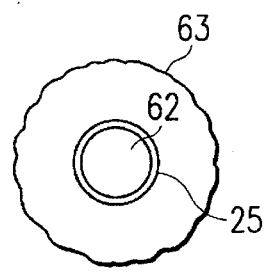
FIG. 13 is a coil with ice build-up using the prior art.
Figure 12:
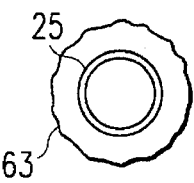
FIG. 12 is a coil having ice build up on its surface after water has been circulated over it according to the present invention.
Figure 14:
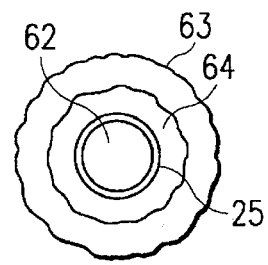
FIG. 14 is a coil with ice build-up after glycol has been circulated through the coil using the prior art.

FIG. 11 is a cross-sectional view of an ice bank 63 built up on a coil 25 of the present invention. The interior of the coil 25 contains the expanded refrigerant gas. FIG. 12 shows the ice bank 63 of FIG. 11 after water has been circulated over it according to the present invention. The ice bank 63 has melted evenly because of the consistent water flow pattern. FIG. 13 shows an ice bank using prior art devices. The ice bank 63 is built up around a coil 25 as in the present invention but glycol is circulated through the coil 25 instead of refrigerant gas. When the glycol use is reversed from heat load to storage, the ice bank melts from the inside out, leaving an insulating layer of water 64 which decreases the cooling efficiency of the thermal storage system.

While the present invention has been disclosed and discussed in connection with the foregoing embodiments, it will be understood that the invention is not limited to the embodiments disclosed, but is capable of numerous rearrangements, modifications, and substitutions of parts and elements without departing from the spirit and scope of the invention.

I claim:

1. A thermal storage system comprising:
    an ice tank suitable for containing water, said ice tank having an inside surface and an outside surface;
    at least two coils, each said coil having a first end and a second end, for transporting refrigerant gas through at least a portion of said ice tank and for forming ice from water circulated through said ice tank;
    refrigerant supply means for providing a flow of cold refrigerant through each said coil;
    water circulation means for circulating water freely among said coils in said tank, said water circulation means having an ice water supply header having a plurality of openings for receiving water that has been circulated over said ice formed on said coils;
    heat exchanger means for receiving ice water from said ice tank and cooling air to be circulated throughout a facility;
    an ice water return header for receiving water from said heat exchanger means and for distributing said water over the surface of said coils and of the ice thereon so as to cool the water;
    a plurality of jets connected to said ice water return header for propelling water between adjacent coils; and
    means for transferring water from the ice tank to the heat exchanger.

2. The thermal storage system of claim 1 wherein the inside surface of said ice tank comprises sand blasted steel having a white steel finish.

3. The thermal storage system of claim 2 wherein the inside surface of said tank further comprises a layer of epoxy resin coating said steel.

4. The thermal storage system of claim 2 wherein said ice tank further comprises an outermost layer of sheet metal.

5. The thermal storage system of claim 4 further comprising a layer of polystyrene insulation between said sheet metal layer and said steel layer.

6. The apparatus of claim 1 further comprising filter means adapted to receive a side stream of water from said ice tank, said filter means being connected to said ice tank and to said means for transferring water from said ice tank to said heat exchanger, said filter means removing particulate matter from the water being circulated and providing agitation of the water in said ice tank.

7. The apparatus of claim 6 wherein said filter means comprises a filter cartridge with a mesh strainer which filters to 500 microns or less.

8. The thermal storage system of claim 1 wherein said at least two coils are comprised of galvanized steel.

9. The thermal storage system of claim 1 wherein said at least two coils are comprised of stainless steel.

10. The thermal storage system of claim 1 further comprising at least one expansion valve wherein said refrigerant supply means comprises a liquid header for receiving liquid refrigerant, said liquid header being connected to said at least one expansion valve and adapted to distribute liquid refrigerant among said at least one expansion valve and said at least two coils.

11. The thermal storage system of claim 1 further comprising a compressor and means for directing expanded refrigerant gas comprising a suction header to collect expanded refrigerant gas from said at least two coils and to direct it to said compressor, said suction header being connected to said second end of each said coil.

12. The thermal storage system of claim 1 wherein said jets are located above the surface of the water in the tank.

13. The thermal storage system of claim 11 wherein said means for directing expanded refrigerant gas further comprises a vertical riser connected to said second end of each said coil for increasing the velocity of the refrigerant gas flowing therethrough and enhancing the return of lubricating oil to the compressor, the inside diameter of said vertical riser being smaller than the inside diameter of each said coil.

14. The thermal storage system of claim 1 further comprising an ice bank controller mounted upon said at least two coils adapted to allow ice to accumulate on said at least two coils to a predetermined thickness.

15. The thermal storage system of claim 1 wherein said heat exchanger means further comprises a cooling coil contained within an air handling unit.

16. The thermal storage system of claim 1 wherein said heat exchanger means further comprises means for circulating cooled water throughout a facility to be cooled.

17. A thermal storage system comprising:

an ice tank suitable for containing water having an inside surface, an outside surface, a bottom, four opposing sides, and a removable top, said bottom, sides and top of the inside surface of the tank comprised of sandblasted steel having a white steel finish, said sides and top further comprising a layer of polystyrene adjacent said sand blasted steel for providing thermal insulation, said bottom and sides of said tank further comprising a layer of epoxy resin coating said steel;

a plurality of coils, each said coil having a first end and a second end, said coils adapted to circulate cold refrigerant gas therethrough and to accumulate ice thereupon when water is circulated among said coils, said coils being fabricated from a thermally conductive material, said coils being further adapted to be received within said ice tank;

a plurality of expansion valves, each said expansion valve being connected to a corresponding first end of said plurality of coils, said plurality of expansion valves being adapted to receive liquid refrigerant and to expand said liquid refrigerant to produce a cooling effect in said plurality of coils and to promote the build up of ice thereon;

a refrigeration system comprising a compressor and a condenser;

a liquid header adapted to receive liquid refrigerant from said refrigeration system, said liquid header being connected to said plurality of expansion valves and said refrigeration system, said liquid header being adapted to distribute liquid refrigerant among said plurality of expansion valves;

a suction header for collecting the expanded refrigerant gas from said plurality of coils and for directing said expanded refrigerant gas to said compressor, said suction header being connected to each said second end of said plurality of coils;

an ice water supply header for receiving ice water after circulation over said plurality of coils and said ice built up thereon;

a heat exchanger adapted to receive ice water from said ice tank and to cool air to be circulated throughout a facility for cooling the facility;

an ice water return header for receiving water from said heat exchanger and to distribute said water substantially over the surface of said plurality of coils and of said ice thereon so as to cool said water;

connecting means to connect said ice tank to said heat exchanger;

pump means to pump water to said ice tank, over ice formed on said plurality of coils, to said heat exchanger and back to said ice tank, said pump means being located in said connecting means; and filter means for receiving a side stream of water from said ice tank, said filter means being connected to said ice tank and to said connecting means, said filter means being adapted to remove particulate matter from the water being circulated and to provide agitation of the water in said ice tank.

18. The thermal storage system of claim 17 wherein said filter means comprises a filter cartridge with a mesh strainer which filters to 500 microns or less.

19. The thermal storage system of claim 17 wherein said plurality of coils are comprised of galvanized steel.

20. The thermal storage system of claim 17 wherein said plurality of coils are comprised of stainless steel.

21. The thermal storage system of claim 17 further comprising vertical risers, said vertical risers extending between said second ends of said plurality of coils to said suction header for increasing the velocity of said refrigerant gas so as to enhance the return of crankcase oil to the compressor, said vertical risers having a smaller inside diameter than the inside diameter of said plurality of coils.

22. The thermal storage system of claim 17 further comprising an ice bank controller located on one of said plurality of coils to control the thickness of said ice that is built up on said plurality of coils.

23. A method for storing thermal energy comprising:

placing water in an ice tank in which the water is able to circulate freely;

expanding liquid refrigerant gas through thermal expansion valves to produce cold refrigerant gas;

circulating said cold refrigerant gas through coils to producing a cooling effect, said coils being contained in said ice tank;

recycling said expanded refrigerant gas to a compressor;

allowing ice to build up on said coils when contacted with said water;

circulating a first stream of water around said ice to chill said water by propelling said water from an ice water return header having at least one jet so that said water contacts said surface of said ice;

extracting said first stream of water from said ice tank through an ice water supply header having a plurality of openings;

directing said first stream of water to a heat exchanger to cool a second stream of fluid and warm said first stream of water;

directing said second stream of fluid through a building to be cooled; and recycling said warmed first stream of water to said ice tank to be chilled again.

24. The method of claim 23 further comprising the step of filtering said first stream of water with a sidestream filter.

25. The method of claim 23 further comprising the step of distributing said liquid refrigerant to said thermal expansion valves through a refrigerant liquid header.

26. The method of claim 23 further comprising the step of collecting said expanded refrigerant gas into a suction header.

27. The method of claim 23 wherein said warmed first stream of water is re-injected into said ice tank using an ice water return header.

28. The method of claim 23 wherein said at least one jet is located above the surface of said water in said ice tank.

29. The method of claim 23 further comprising the step of measuring the thickness of said ice built up on said coils.

30. The method of claim 29 further comprising the step of controlling the circulation of said refrigerant gas in said thermal storage system in response to the thickness of said ice built up on said coils.

31. The method of claim 23 wherein said second fluid stream is a stream of air cooled by a cooling coil within an air handling unit.

* * * * *